United States Patent [19]

Brooks

[11] 4,065,077
[45] Dec. 27, 1977

[54] ATTACHMENT FOR ATTACHING JET PROPULSION ENGINES TO FIXED STRUCTURE

[75] Inventor: Leslie John Brooks, Aston-on-Trent, England

[73] Assignee: Rolls-Royce Limited, London, England

[21] Appl. No.: 790,609

[22] Filed: Apr. 25, 1977

[30] Foreign Application Priority Data

Apr. 30, 1976 United Kingdom ............... 17642/76

[51] Int. Cl.² ............................................. B64D 27/12
[52] U.S. Cl. .................................... 244/54; 60/39.31; 248/5
[58] Field of Search .............. 244/53 R, 54; 60/39.31; 248/5

[56] References Cited

U.S. PATENT DOCUMENTS

| 3,831,888 | 8/1974 | Baker et al. ........................... 244/54 |
| 3,844,115 | 10/1974 | Freid .................... 60/39.31 |
| 4,037,809 | 7/1977 | Legrand ............... 248/5 X |

FOREIGN PATENT DOCUMENTS 1,236,917  6/1971  United Kingdom ................ 248/5

*Primary Examiner*—Galen L. Barefoot
*Attorney, Agent, or Firm*—Cushman, Darby & Cushman

[57] ABSTRACT

An attachment bracket for attaching a jet engine to e.g. an aircraft has an extra connecting feature which surrounds one of the existing engine mounting features with a space between them, so that if an existing engine mounting breaks, the engine will only move a distance equal to the clearance before being restrained and supported again.

5 Claims, 4 Drawing Figures

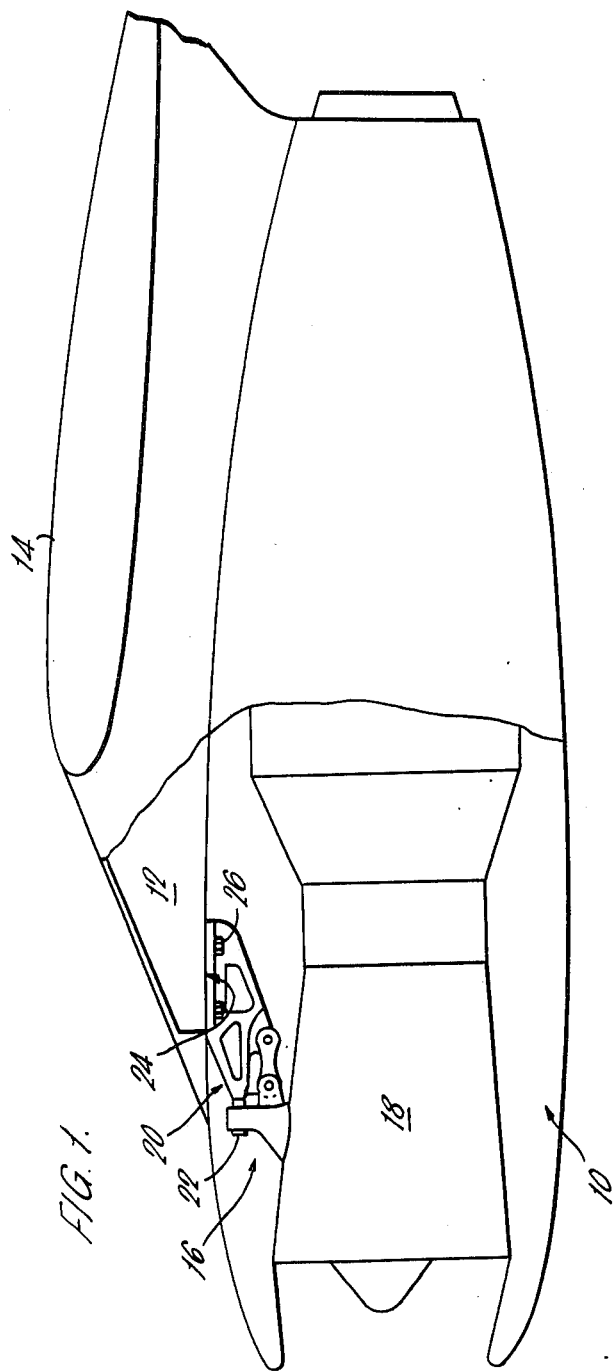
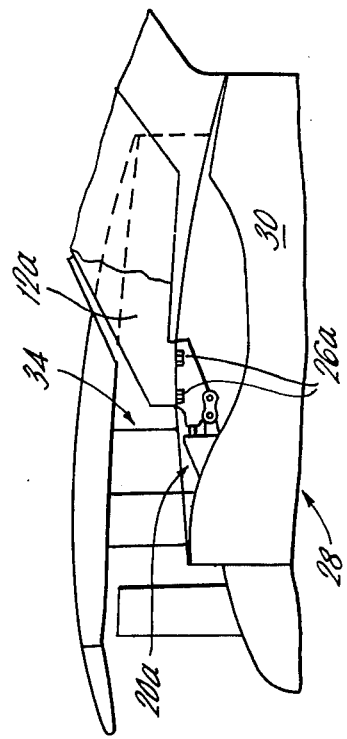
FIG. 1.
FIG. 2.

ATTACHMENT FOR ATTACHING JET PROPULSION ENGINES TO FIXED STRUCTURE

This invention concerns an attachment for attaching jet propulsion engines to vehicle structure.

According to the present invention, jet engine attachment apparatus comprises a jet engine casing having a boss structure with a projection on its external surface, a bracket adapted for rigid fixing to vehicle structure and having a first portion adapted for close fitting engagement with said boss structure to support a jet engine's weight, a second portion adapted for remote connection with said projection for transmission of jet thrust loads to vehicle structure via the bracket and a third portion adapted to surround said projectiion in close spaced relationship, so that in the event of breakage of said engaging or connecting features during operation of a jet engine attached to vehicle structure by the apparatus, the jet engine will move to engage said third portion and be restrained thereby.

Figure 3:
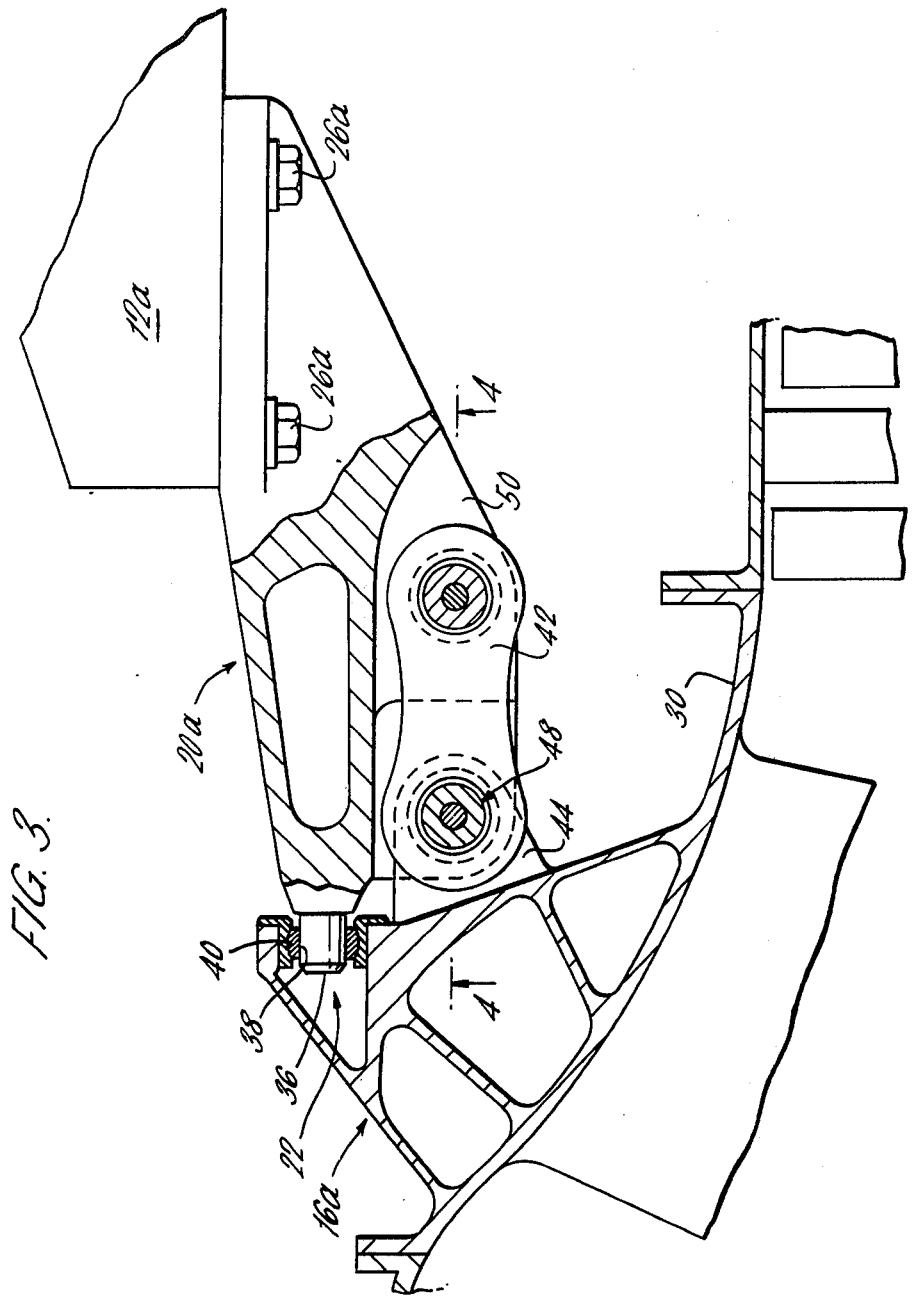
Figure 4:
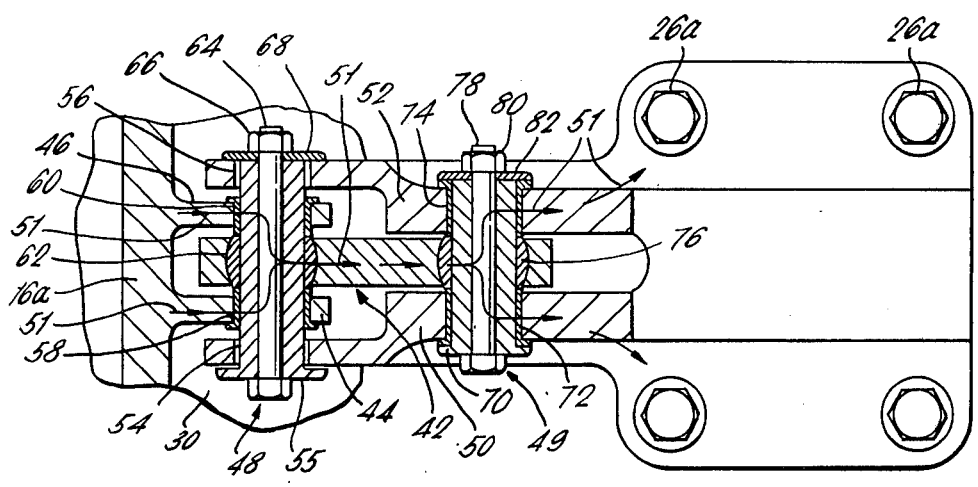

The invention will now be described with reference to the accompanying drawings in which:

FIG. 1 is a diagrammatic view of a jet propulsion engine incorporating the invention, FIG. 2 is a diagrammatic view of a jet propulsion engine having a ducted fan and incorporating the invention, FIG. 3 is an enlarged part cross-sectional view of FIG. 2, and FIG. 4 is a view on line 4—4 of FIG. 3.

It should be understood that where the term 'upstream' or 'downstream' are used in this specification, it is in relation to the direction of flow of gases through the engine.

In FIG. 1, a jet propulsion engine 10 is attached near its upstream end to a pylon 12 which in turn depends from the wing 14 of an aircraft (not shown). The attachment is achieved by a boss structure 16 mounted externally of the casing 18 of engine 10 and a bracket 20, the upstream end 22 of which locates within the boss structure and the downstream end of which is clamped to the undersurface 24 of the pylon by setscrews 26. The downstream portion of the engine is supported from the pylon 12 via anti torque links (not shown) in known manner.

In FIG. 2 a ducted fan jet propulsion engine 28 is attached via its core gas generator casing 30 and an attachment which is identical with the attachment of FIG. 1, to the underside of a pylon 12a. The pylon 12a passes through the fan duct 32 and is enclosed by a streamlined structure 34 again in known maner, so as to reduce turbulence in the fan duct.

Referring now to FIG. 3, the upstream end 22 of bracket 20a has a spigot 36 formed on it, which is a close, sliding fit in a bore 38 in a spherical sleeve 40 which in turn is retained in a spherical seating in boss structure 16a. It is this particular connection between bracket and boss which absorbs all engine operating loads exerted radially of the spigot, in a plane normal to the spigot axis.

A link 42 is pivotally fixed by one end to a pair of flanges 44,46 formed on the downstream face of boss structure 16a, by means of a pin assembly 48. The other end of the link is pivotally fixed between a pair of flanges 50,52 formed on the underside of bracket 20a by a pin assembly 49. This connection absorbs all thrust loads exerted by the engine in operation, and transfers them to the pylon and thence to aircraft structure along the paths depicted by arrows 51 (FIG. 4).

The arrangement is shown more clearly in FIG. 4 to which reference will now be made. Pin assembly 48 comprises a hollow shouldered pin 55 which projects through extensions on bracket flanges 50,52 with radial clearances 54,56 therebetween and through boss flanges 44,46 and an end of link 42, the fit of the pin in the flanges 44,46 and link 42 being firm, but permitting relative pivoting of those parts. Bearing sleeves 58,60 and part-spherical sleeve 62 are utilised to provide the necessary fit. A bolt 64 passes right through pin 55 and is retained by a nut 66 which also traps a washer 68 against the side of flange 52, thereby retaining pin 55 in the flanges.

pin assembly 49 comprises a further hollow shouldered pin 70 which firmly but pivotally registers in flanges 50,52 via bearing sleeves 72, 74 and in the other end of link 42 via a spherical joint 76. Pin 70 is also retained by a bolt 78, nut 80 and a washer 82.

The arrangement of the mounting attachment is such that should spigot 36 break, the engine will drop only that distance provided by clearances 54,56 after which, those loads e.g. engine weight, formerly supported by the spigot, will be taken by the projecting extremities of pin 55 bearing on the extensions of flanges 50,52 and passed thereby via the bracket to pylon 12a.

Should link 42 break, then engine thrust loads will be taken by the projecting extremities of pin 55, once the engine has moved upstream to take up clearances 54,56, whereafter the thrust loads are transferred via the bracket to the pylon.

With such an arrangement it should enable an aeroplane to maintain safe flight until a proper landing is possible.

I claim:

1. Jet engine attachment apparatus comprising a jet engine casing having a boss structure with a projection on its external surface, a bracket adapted for rigid fixing to vehicle structure and having a first portion adapted for close fitting engagement with said boss structure to support a jet engine's weight, a second portion adapted for remote connection with said projection for transmission of jet thrust loads to vehicle structure via the bracket and a third portion adapted to surround said projection in close spaced relationship, so that in the event of breakage of said engaging or connecting features during operation of a jet engine attached to vehicle structure by the apparatus, the jet engine will move to engage said third portion and be restrained thereby.

2. Jet engine attachment apparatus as claimed in claim 1 wherein the boss structure is a member adapted for detachable attachment to the jet engine casing.

3. Jet engine attachment apparatus as claimed in claim 1 wherein said second portion is adapted for remote connection by way of having one end of a link connected to it in close fitting relationship, the other end of the link being connectable to the projection in close fitting relationship.

4. Jet engine attachment apparatus as claimed in claim 1 wherein the projection comprises a pin of sufficient length to engage the link end and boss structure and project beyond each side thereof so as to be surrounded by said third portion in close spaced relationship therewith.

5. Jet engine attachment apparatus as claimed in claim 4 wherein said third portion comprises a pair of flanges, each with a hole therein, to permit passage of said pin in closed spaced relationship.

* * * * *